United States Patent [19]
Tucholski et al.

[11] Patent Number: 6,087,041
[45] Date of Patent: Jul. 11, 2000

[54] ELECTROCHEMICAL CELL STRUCTURE EMPLOYING ELECTRODE SUPPORT FOR THE SEAL

[75] Inventors: Gary R. Tucholski, Parma Heights; Frank J. Puglia, Avon Lake, both of Ohio

[73] Assignee: Eveready Battery Company, Inc., St. Louis, Mo.

[21] Appl. No.: 09/036,115

[22] Filed: Mar. 6, 1998

[51] Int. Cl.[7] .............................. H01M 2/10; H01M 2/00; H01M 6/00
[52] U.S. Cl. .......................... 429/186; 29/623.2; 429/161; 429/163; 429/175
[58] Field of Search ...................................... 429/161, 163, 429/175, 176, 185, 186, 157; 29/623.2

[56] References Cited

U.S. PATENT DOCUMENTS

| | | |
|---|---|---|
| 3,314,824 | 4/1967 | Spanur . |
| 3,664,878 | 5/1972 | Amthor . |
| 3,884,722 | 5/1975 | Tucholski . |
| 4,122,241 | 10/1978 | Ciliberti, Jr. et al. .................. 429/133 |
| 4,357,398 | 11/1982 | Nelson et al. .............................. 429/94 |
| 4,564,568 | 1/1986 | Hasenauer et al. ...................... 429/104 |
| 5,173,371 | 12/1992 | Huhndorff et al. .......................... 429/1 |

*Primary Examiner*—Maria Nuzzolillo
*Assistant Examiner*—Tracy Dove
*Attorney, Agent, or Firm*—Robert W. Welsh; Stewart A. Fraser

[57] ABSTRACT

An electrochemical cell is disclosed having a cylindrical can having an open end and a closed end, and a first electrode having a generally hollow cylindrical shape molded in place within the can such that an outer cylindrical surface of the first electrode contacts an inner cylindrical surface of the can. The first electrode has a recess adjacent to the inner cylindrical surface of the can at an end of the first electrode proximate the open end of the can to accommodate any flashing that is formed along the interior side walls of the can when the first electrode is molded in place. The electrochemical cell further includes a second electrode having a polarity opposite the first electrode disposed within a hollow cavity of the first electrode, a separator lining the hollow cavity within the first electrode so as to physically separate the first and second electrodes, and a collector assembly supported by the first electrode for sealing the open end of the can. As an alternative to providing a recess in the first electrode, a flat annular ring made of electrochemically active material may be provided between the flat upper surface of the first electrode and the bottom surface of the collector assembly.

20 Claims, 5 Drawing Sheets

ELECTROCHEMICAL CELL STRUCTURE EMPLOYING ELECTRODE SUPPORT FOR THE SEAL

BACKGROUND OF THE INVENTION

The present invention generally relates to an electrochemical cell construction. More particularly, the present invention relates to the construction of an electrochemical cell that provides support for a low-profile collector assembly.

FIG. 1 shows the construction of a conventional C-sized alkaline cell 10. As shown, cell 10 includes a cylindrically-shaped can 12 having an open end and a closed end. Can 12 is preferably formed of an electrically-conductive material such that an outer cover (not shown) welded to a bottom surface 14 at the closed end of can 12, serves as an electrical contact terminal for the cell.

Cell 10 further typically includes a first electrode material 15, which may serve as the positive electrode (also known as a cathode). The first electrode material 15 may be preformed and inserted into can 12 or, more preferably, may be molded in place so as to contact the inner surfaces of the can 12. After the first electrode 15 has been provided in can 12, a separator 17 is inserted into the space defined by first electrode 15. Once separator 17 is in place within the cavity defined by first electrode 15, an electrolyte is dispensed into the space defined by separator 17 along with a mixture 20 of an electrolyte and a second electrode material, which may be the negative electrode (also known as the anode). The electrolyte/second electrode mixture 20 preferably includes a gelling agent.

After the first electrode 15, separator 17, the electrolyte, and mixture 20 have been formed inside can 12, a preassembled collector assembly 25 is inserted into the open end of can 12. Can 12 is typically slightly tapered to have a larger diameter at its open end. This taper serves to support the collector assembly in a desired orientation prior to securing it in place. After collector assembly 25 has been inserted, an outer cover 45 is placed over collector assembly 25. Collector assembly 25 and outer cover 45 are secured in place by radially squeezing and crimping an upstanding wall of collector assembly 25 and outer cover 45 within the end edge 13 of can 12. As described further below, the primary function served by collector assembly 25 is to provide for a second external electrical contact for the electrochemical cell. Additionally, collector assembly 25 must seal the open end of can 12 to prevent the electrochemical materials therein from leaking from the cell.

The collector assembly 25 shown in FIG. 1 includes a seal 30, a collector nail 40, an inner cover 44, a washer 50, and a plurality of spurs 52. Seal 30 is shown as including a central hub 32 having a hole through which collector nail 40 is inserted. Seal 30 further includes a V-shaped portion 34 that may contact an upper surface 16 of first electrode 15 and to provide a spring-like force radially outward.

Seal 30 also includes a peripheral upstanding wall 36 that extends upward along the periphery of seal 30 in an annular fashion. Peripheral upstanding wall 36 not only serves as a seal between the interface of collector assembly 25 and can 12, but also serves as an electrical insulator for preventing an electrical short from occurring between the positive can and negative contact terminal of the cell.

Inner cover 44, which is formed of a rigid metal, is provided to increase the rigidity and to support the radial compression of collector assembly 25 thereby improving the sealing effectiveness. As shown in FIG. 1, inner cover 44 is configured to contact central hub portion 32 and peripheral upstanding wall 36. By configuring collector assembly 25 in this fashion, inner cover 44 serves to enable compression of central hub portion 32 by collector nail 40 while also supporting compression of peripheral upstanding wall 36 by the inner surface of can 12.

Outer cover 45 is typically made of a nickel-plated steel and is configured to extend from a region defined by the annular peripheral upstanding wall 36 of seal 30 and to be in electrical contact with a head portion 42 of collector nail 40. Typically, outer cover 45 is welded to head portion 42 of collector nail 40 to prevent any loss of contact. As shown in FIG. 1, when collector assembly 25 is inserted into the open end of can 12, collector nail 40 penetrates deeply within the electrolyte/second electrode mixture 20 to establish sufficient electrical contact therewith.

In the example shown in FIG. 1, outer cover 45 includes an upstanding wall 47 that extends vertically upward along the circumference of outer cover 45. By forming peripheral upstanding wall 36 of seal 30 of a length greater than that of upstanding wall 47, a portion of peripheral upstanding wall 36 may be folded over upstanding wall 47 during the crimping process so as to prevent any portion of the upper edge 13 of can 12 from coming into contact with outer cover 45.

Seal 30 is preferably formed of nylon. In the configuration shown in FIG. 1, a pressure relief mechanism is provided for enabling the relief of internal pressure when such pressure becomes excessive. Further, inner cover 44 and outer cover 45 are typically provided with apertures (not shown) that allow the hydrogen gas to escape to the exterior of cell 10. The mechanism shown includes an annular metal washer 50 and a plurality of spurs 52 that are provided between seal 30 and inner cover 44. The plurality of spurs 52 each include a pointed end 53 that is pressed against a thin intermediate portion 38 of seal 30. Spurs 52 are biased against the lower inner surface of inner cover 44 such that when the internal pressure of cell 10 increases and seal 30 consequently becomes deformed by pressing upward toward inner cover 44, the pointed ends 53 of spurs 52 penetrate through the thin intermediate portion 38 of seal 30 thereby rupturing seal 30 and allowing the escape of the internally-generated gas.

Although the above-described collector assembly 25 performs all the above-noted desirable functions satisfactorily, as apparent from its cross-sectional profile, this particular collector assembly occupies a significant amount of space within the interior of the cell 10. Because the interior dimensions of the electrochemical cell are generally fixed, the greater the space occupied by the collector assembly, the less space that there is available within the cell for the electrochemical materials. Consequently, a reduction in the amount of electrochemical materials that may be provided within the cell results in a shorter service life for the cell. Collector assemblies have subsequently been designed that have a lower profile and thus occupy less space within the electrochemical cell.

To reduce the profile of the collector assembly, the V-shaped portion 34 is typically eliminated leaving a flat bottom surface on the collector assembly that opposes the upper surface 16 of first electrode 15. Also, the area in which the collector assembly contacts the inner surface of the can is also reduced. These changes are not without problems. By reducing the can/collector assembly contact area, the friction fit of the collector assembly in the can becomes less secure thereby making it more likely that the collector assembly will move during crimping. Thus, some additional structure must be provided to support the collector assembly during crimping. If the collector assembly is left without additional support during crimping, a low-profile collector assembly will most likely be cocked with respect to the can when it is crimped in place. When the collector assembly is cocked, it will not create an adequate seal at the open end of the can and will be very likely to leak.

One technique used to support the collector assembly is to bead the can about its circumference in an area just above first electrode 15, as shown in FIG. 2. By providing a bead 102, a collector assembly, such as the low-profile collector assembly 125 shown in FIG. 2, may be inserted in the open end of can 12 and supported on bead 102 while end 103 of can 12 is crimped down on collector assembly 125. Further, by providing a sturdy support for the collector assembly, a lower profile crimp may be utilized that applies a downward axial force against the collector assembly with edge 103 of can 12 so that the collector assembly is pinched between bead 102 and edge 103. As compared with the crimp profile shown in FIG. 1, the low-profile crimp shown in FIG. 2 allows for more space in the interior of the cell.

Although the beading technique works satisfactorily when the first electrode 15 is preformed as a plurality of annular rings 15a and 15b that are stacked within can 12 prior to beading of can 12, the technique does require that beading take place after first electrode 15 has been inserted. Further, when first electrode 15 is molded in place within can 12, the beading must also take place after first electrode 15 has been inserted, otherwise molding the upper surface of first electrode 15 in the vicinity of bead 102 would be difficult. Furthermore, regardless of the method used to deposit first electrode 15 in can 12, bead 102 takes up additional space within the interior of the electrochemical cell.

As a solution to the foregoing problems, it has been proposed to support the collector assembly directly on the upper surface 16 of first electrode 15. However, if the first electrode material 15 is deposited in can 12 as a plurality of stacked preformed annular rings 15a and 15b, the stacked rings do not provide uniform electrode surface height from cell to cell to consistently support the collector assembly. If the first electrode material 15 is molded in place, flashing 18 (FIG. 3) is typically formed along the side interior walls of can 12 above the upper surface (16) of the first electrode (15). The formation of this flashing is problematic in that it will either come between the peripheral edge of the collector assembly and the inner surface of the can or get folded over when the collector assembly is inserted in a manner similar to that shown in FIG. 3. If the collector assembly 125 rests on top of flashing 18, collector assembly 125 will be cocked with respect to can 12 thereby increasing the likelihood that the cell closing will be ineffective by resulting in a leaking cell. If flashing 18 comes between a peripheral edge 116 of collector assembly 125 and the side wall of can 12, collector assembly 125 may also be cocked. In either event, the existence of the flashing is likely to cause leakage.

Because the removal of flashing is not without cost due to the difficulty removing all $MnO_2$ residue on the can wall, there exists a need for a different configuration to support a collector assembly in an electrochemical cell without requiring any significant amount of space within the interior cell to be occupied by structure other than the active electrochemical materials of the cell.

SUMMARY OF THE INVENTION

Accordingly, it is an aspect of the present invention to solve the above problems by providing an electrochemical cell configuration providing support for a low-profile collector assembly on an upper surface of a first electrode that is molded in place in the cell can. Another aspect of the present invention is to provide an electrochemical cell having a construction by which a collector assembly is supported on a molded-in-place electrode without requiring removal of any flashing formed as a result of the molding of the first electrode.

To achieve these and other aspects and advantages, the electrochemical cell of the present invention comprises a cylindrical can having an open end and a closed end; a first electrode having a generally hollow cylindrical shape molded in place within the can such that an outer cylindrical surface of the first electrode contacts an inner cylindrical surface of the can, the first electrode having a recess adjacent the inner cylindrical surface of the can at an end of the first electrode proximate the open end of the can; a second electrode having a polarity opposite the first electrode disposed within a hollow cavity of the first electrode; a separator lining the hollow cavity within the first electrode so as to physically separate the first and second electrodes; and a collector assembly supported by the first electrode for sealing the open end of the can. As an alternative to providing a recess in the first electrode, a flat annular washer ring of electrochemically active material may be provided between the flat upper surface of the first electrode and the bottom surface of the collector assembly.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
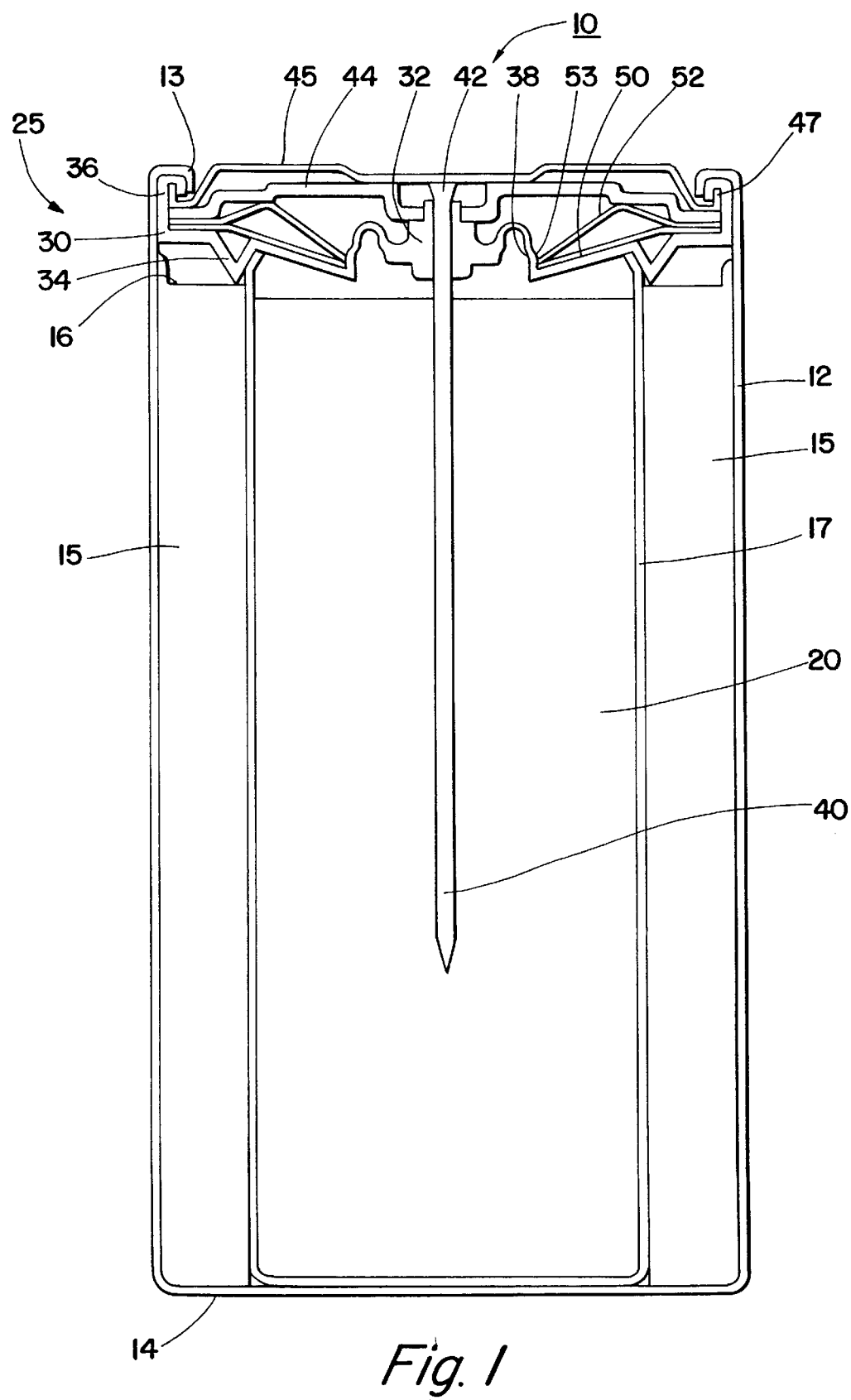
FIG. 1 is a cross section of a conventional C-sized alkaline electrochemical cell.
Figure 2:
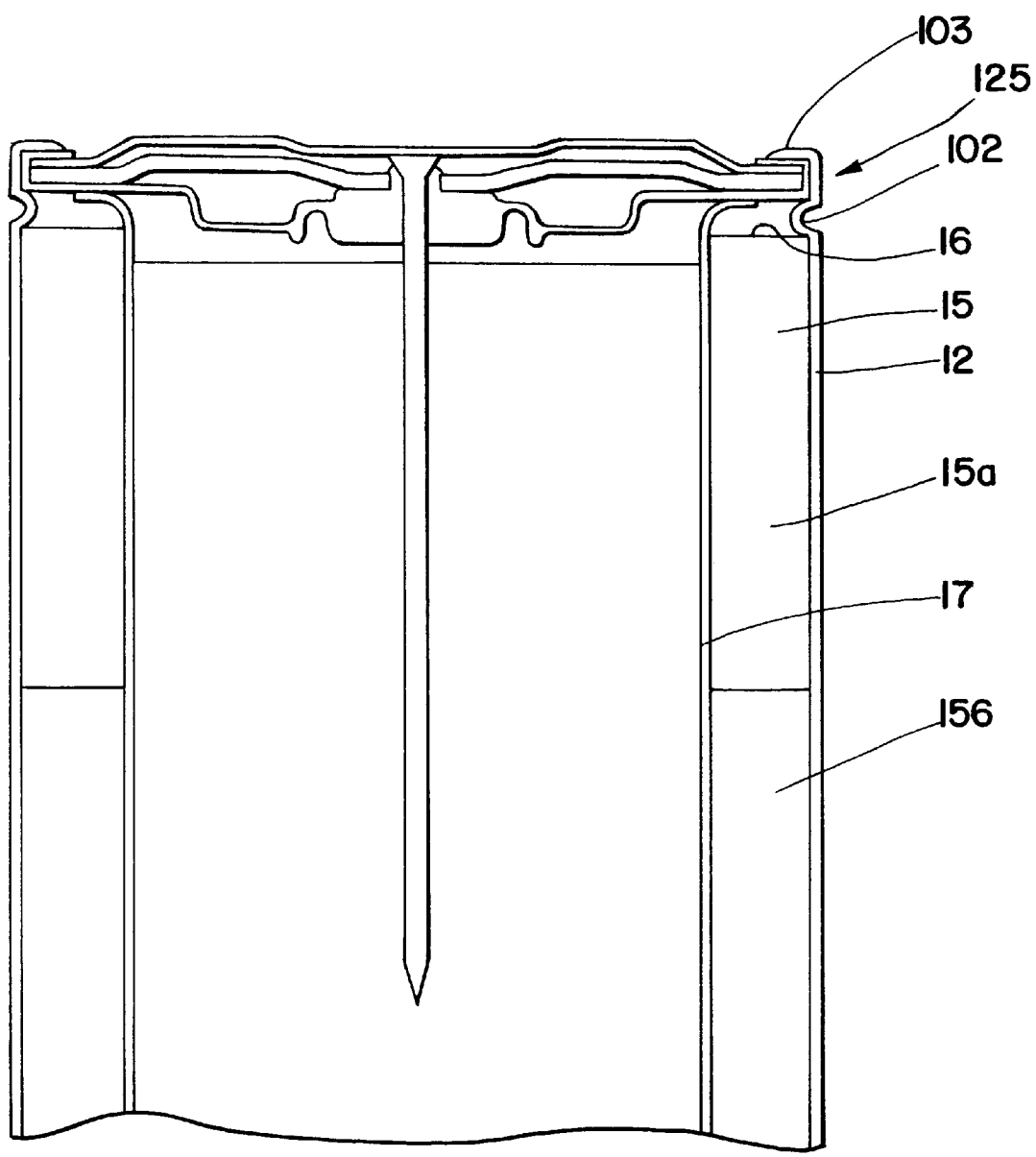
FIG. 2 is a cross section of a portion of an electrochemical cell utilizing a low-profile collector assembly supported by a bead in the cell can.
Figure 3:
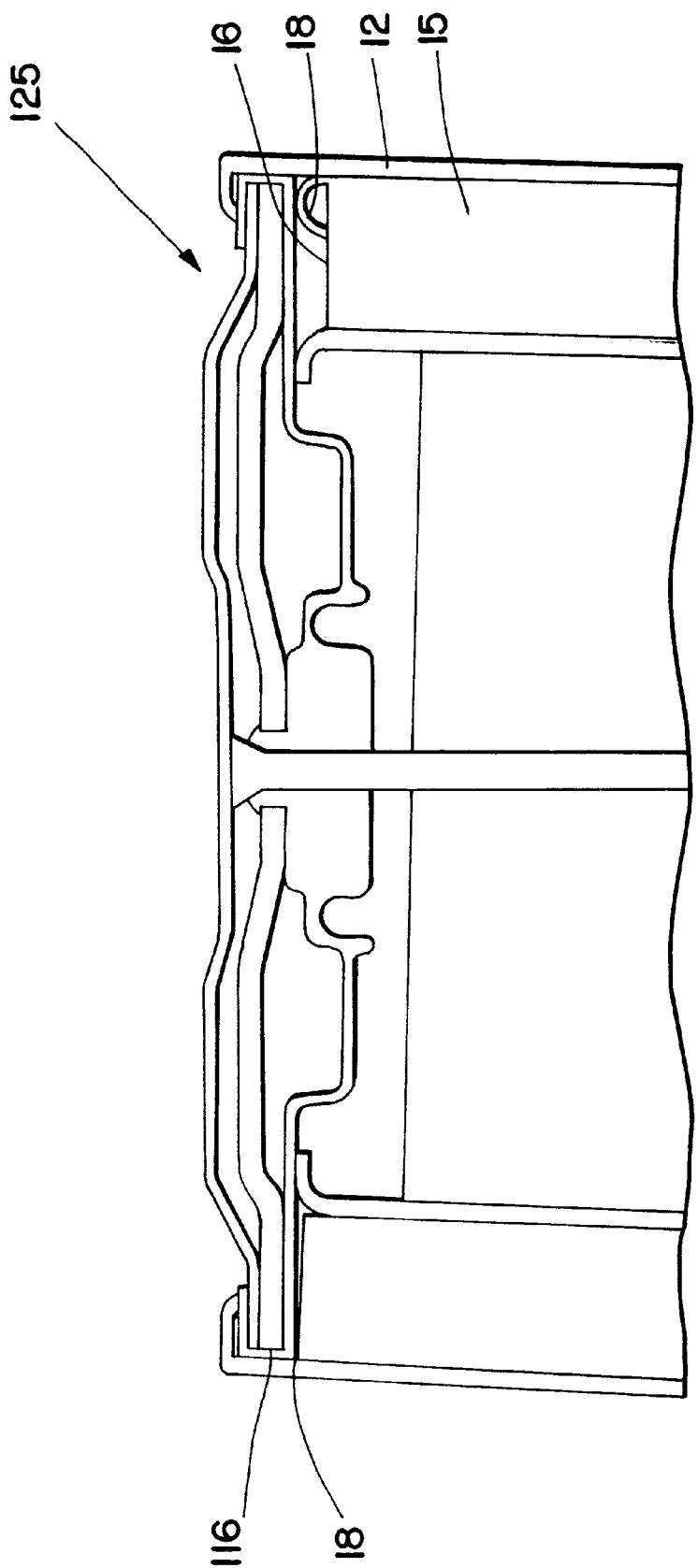
FIG. 3 is a cross section of a portion of an electrochemical cell having a low-profile seal shown as it would appear if the first electrode material were molded within the cell can in the conventional manner.
Figure 4:
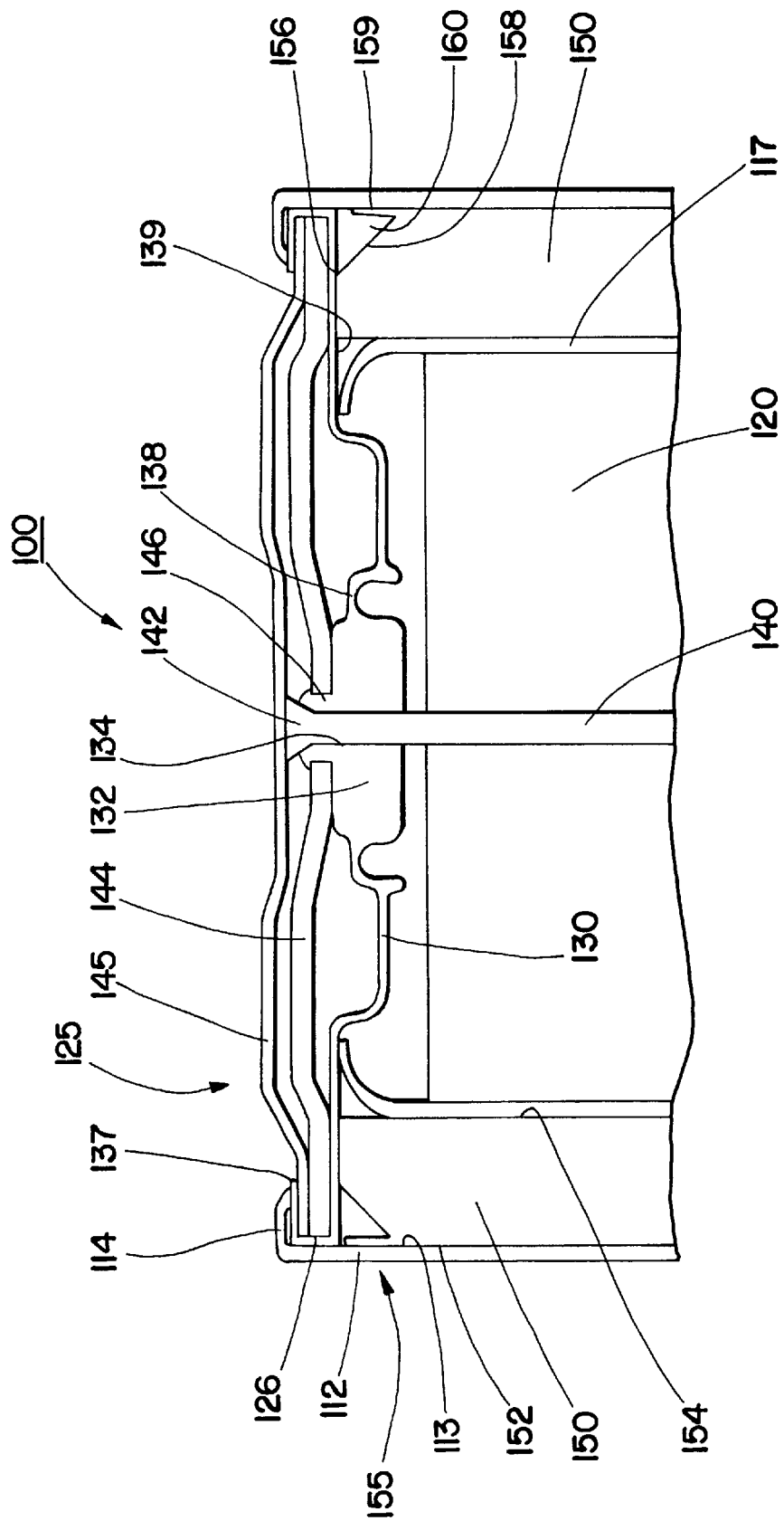
FIG. 4 is a cross section of a portion of an electrochemical cell constructed in accordance with a first embodiment of the present invention.

FIG. 4 shows a cross section of a portion of an electrochemical cell 100 constructed in accordance with a first embodiment of the present invention. As will be appreciated by those skilled in the art, the portion of electrochemical cell 100 that is not shown in FIG. 4 has substantially the same construction as the corresponding portion of the electrochemical cell 10 shown in FIG. 1. Further, it will be appreciated by those skilled in the art that with the exceptions noted below, electrochemical cell 100 is radially symmetric about an axial centerline of the cell.

Electrochemical cell 100 includes a cylindrical can 112 having an open end and a closed end. Can 112 is preferably formed of metal or another electrically-conductive material.

Electrochemical cell 100 further includes a first electrode 150 having a generally hollow cylindrical shape defined in part by an outer cylindrical surface 152, an inner cylindrical surface 154, and an end portion 155 including a flat first surface 156 extending from, and perpendicular to, inner cylindrical surface 154. First electrode 150 is disposed in can 112 such that outer cylindrical surface 152 is in contact with an inner cylindrical surface 113 of can 112. End portion 155 of first electrode 150 preferably includes a second surface 158 extending from outer cylindrical surface 152 toward flat first surface 156. Second surface 158 is preferably inclined with respect to flat first surface 156 so as to join flat surface 156 at an angle. The axial length of outer cylindrical surface 152 is preferably shorter than the axial length of inner cylindrical surface 154 such that a recess 160 adjacent inner cylindrical surface 113 of can 112 is provided at end 155 of first electrode 150. By providing a recess 160 in this manner, the height of any flashing 159 that would be formed when molding first electrode 150 in place within can 112, would not be greater than the height of flat first surface 156, which forms a ledge upon which a collector assembly 125 is supported. Thus, collector assembly 125 may be supported on first electrode 150 without interference from flashing 159.

Although recess 160 is shown as being defined by second inclined surface 158, it will be appreciated by those skilled in the art that surface 158 could be curved or shaped in any fashion provided a sufficient recess 160 were provided to enable collector assembly 125 to be supported on flat surface 156 above the top of any flashing 159 that may extend vertically upward along inner cylindrical surface 113 of can 112. For C- and D-sized cells, flashings may have heights up to one-eighth inch. Therefore, recess 160 typically should have a depth of at least one-eighth inch to accommodate flashing 159.

As apparent from the foregoing description, first electrode 150, which for an alkaline cell is preferably a positive electrode including $MnO_2$, is formed by placing an appropriately-shaped mold having an annular protrusion within can 112 and then injecting the material used to form first electrode 150. The mold used to form electrode 150 would be configured to define recess 160 in first electrode 150. Once first electrode 150 has been molded in place and the mold removed from can 112, a separator 117 is inserted to line the hollow cavity defined by the inner cylindrical surface 154 of first electrode 150. Subsequently, a mixture of an electrolyte and a second electrode material 120 is dispensed within the lined hollow cavity defined by first electrode 150 and separator 117. Mixture 120 preferably includes a gelling agent. For an alkaline cell, mixture 120 preferably includes KOH and water as an electrolyte and Zn as a negative second electrode.

After mixture 120 has been dispensed in place, a preassembled collector assembly 125 is inserted into the open end of can 112 such that a bottom surface 139 thereof rests directly upon flat surface 156 of first electrode 150. Then, an edge 114 at the open end of can 112 is crimped downward over a peripheral edge 126 of collector assembly 125 to firmly secure collector assembly 125 in place and thereby effectively seal and close the open end of can 112. By configuring end portion 155 of first electrode 150 such that flat first surface 156 extends at least one quarter the radial distance between inner and outer cylindrical surfaces 152 and 154, first electrode 150 supports collector assembly 125 over one quarter of the width of first electrode 150, which is sufficient to allow an axial crimp to be used to secure collector assembly 125 in place.

In general, collector assembly 125 includes a seal 130, which is typically made of nylon, a metal inner cover 144, a collector nail 140, and an outer cover 145. As noted above, collector assembly 125 is preferably assembled prior to its insertion within the open end of can 112.

As shown, seal 130 includes a hub portion 132 that extends through a central aperture 146 formed in inner cover 144. Hub portion 132 includes a central hole 134 into which collector nail 140 is inserted. Seal 130 further includes a flat lower surface 139 about its periphery such that it may rest uniformly across flat first surface 156 of first electrode 150. An upstanding wall 137 extends along a peripheral edge 126 of inner cover 144 and outer cover 145 to create a seal between the collector assembly and inner surface 113 of can 112. Further, lip 137 serves as an electrical insulator for preventing electrical contact between the crimped end 114 of can 112 and inner or outer covers 144 or 145. Similarly, flat peripheral portion 139 of seal 130 also electrically isolates inner cover 144 from first electrode 150.

To allow the release of excessive internal cell pressure, seal 130 is formed with a thin portion 138, which ruptures when the pressure inside the cell becomes excessive. Inner cover 144 and outer cover 145 include vent holes (not shown) that allow the internally-generated gas to escape to the exterior of the cell.

Inner cover 144 and outer cover 145 are preferably formed of a conductive metal. Outer cover 145 is preferably welded to a head portion 142 of collector nail 140 to provide an external electrical contact to the second electrode included in mixture 120.

Although a particular collector assembly 125 is shown in the drawings, collector assemblies of virtually any construction that would allow it to be supported on an upper surface of a first electrode, could be utilized. An alternative low-profile collector assembly is disclosed in commonly-assigned U.S. patent application Ser. No. 09/036,208, the disclosure of which is hereby incorporated by reference.

Figure 5:
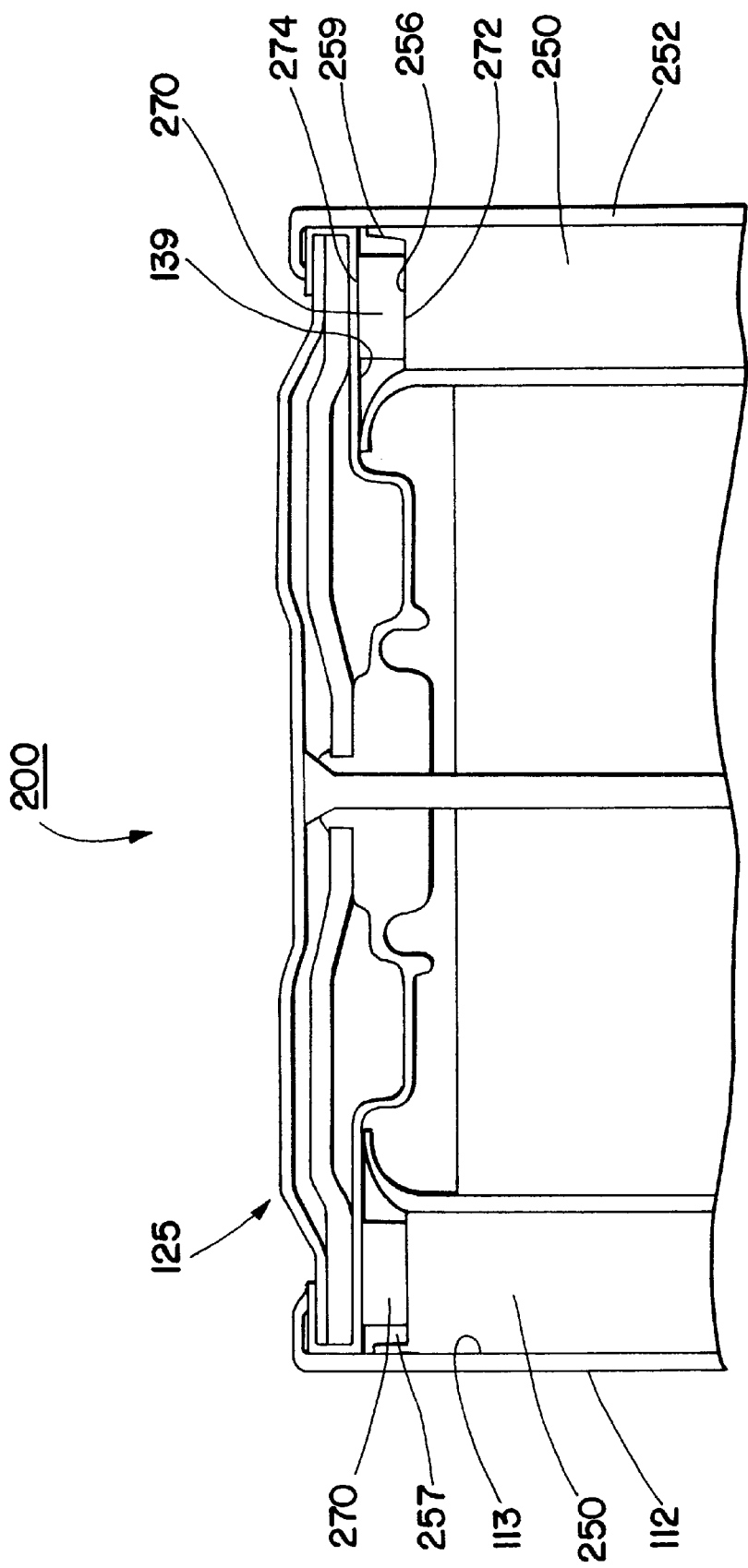
FIG. 5 is a cross section of a portion of an electrochemical cell constructed in accordance with a second embodiment of the present invention.

FIG. 5 shows an electrochemical cell 200 constructed in accordance with the second embodiment of the present invention. The construction of electrochemical cell 200 differs from the construction of cell 100 in that the recess 160 provided in the upper portion of first electrode 150 in cell 100 is not provided in first electrode 250 of cell 200. Instead, a flat annular ring 270 is provided between a flat top surface 256 of first electrode 250 and a bottom surface 139 of collector assembly 125 to indirectly support collector assembly 125 on first electrode 250. As shown in FIG. 5, ring 270 includes a flat bottom surface 272 for resting on flat surface 256 of first electrode 250, and a top flat surface 274 upon which flat bottom surface 139 of collector assembly 125 may rest. To accommodate any flashing 259 formed along the inner cylindrical surface 113 of can 112, the outer diameter of ring 270 is less than the outer diameter of first electrode 250. To provide adequate support, ring 270 preferably has a radial thickness that is at least half the radial thickness of first electrode 250. The axial thickness of ring 270 should be greater than the height of any flashing 259 that may be formed so as to prevent flashing 259 from interfering with the seal formed between collector assembly 125 and can 112. As noted above, for C- and D-sized cells, flashings may be formed with heights up to one-eighth inch. Therefore, ring 270 should have an axial thickness of at least one-eighth inch when used for C- and D-sized cells.

Ring 270 may be formed of an electrochemically active material, such as $MnO_2$, $AgO_2$, hydrogen absorbing materials, or catalytic materials.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An electrochemical cell comprising:
   a cylindrical can having an open end and a closed end;
   a first electrode having a generally hollow cylindrical shape defined in part by an outer cylindrical surface, an inner cylindrical surface, and an end portion extending between said inner and outer cylindrical surfaces, said end portion including a flat first surface extending from and perpendicular to said inner cylindrical surface, said outer cylindrical surface having a shorter axial length than said inner cylindrical surface, said first electrode being disposed in said can such that said outer cylindrical surface of said first electrode is in contact with an inner cylindrical surface of said can;
   a second electrode having a polarity opposite said first electrode disposed within a hollow cavity of said first electrode;
   a separator lining the hollow cavity within said first electrode so as to physically separate said first and second electrodes; and
   a collector assembly supported on said flat first surface of said first electrode for sealing said open end of said can.

2. The electrochemical cell as defined in claim 1, wherein said end portion further includes a second surface extending from said outer cylindrical surface toward said flat first surface.

3. The electrochemical cell as defined in claim 2, wherein said second surface is inclined with respect to said flat first surface so as to join said flat first surface at an angle.

4. The electrochemical cell as defined in claim 1, wherein said flat first surface extends at least one quarter the radial distance between said inner and outer cylindrical surfaces.

5. The electrochemical cell as defined in claim 1, wherein said collector assembly includes an inner cover and a seal provided between said inner cover and said flat first surface and between said inner cover and said inner cylindrical surface of said can, wherein said collector assembly is supported on said flat first surface of said first electrode by placing said seal directly on said flat first surface.

6. The electrochemical cell as defined in claim 1, wherein said first electrode is molded in place within said can.

7. The electrochemical cell as defined by claim 1, wherein said first electrode is a positive electrode.

8. The electrochemical cell as defined by claim 1, wherein said first electrode includes $MnO_2$ and said second electrode includes Zn.

9. An electrochemical cell comprising:
   a cylindrical can having an open end and a closed end;
   a first electrode having a generally hollow cylindrical shape defined in part by an outer cylindrical surface, an inner cylindrical surface, and a flat surface extending perpendicularly between said inner and outer cylindrical surfaces, said first electrode being disposed in said can such that said outer cylindrical surface of said first electrode is in contact with an inner cylindrical surface of said can;
   a second electrode having a polarity opposite said first electrode disposed within a hollow cavity of said first electrode;
   a separator lining the hollow cavity within said first electrode so as to physically separate said first and second electrodes;
   a flat annular ring made of electrochemically active material positioned on said flat surface of said first electrode; and
   a collector assembly supported on said ring for sealing said open end of said can.

10. The electrochemical cell as defined by claim 9, wherein an outer diameter of said ring is less than the diameter of said outer cylindrical surface of said first electrode.

11. The electrochemical cell as defined by claim 10, wherein said inner diameter of said ring is equal to or greater than the diameter of said inner cylindrical surface.

12. The electrochemical cell as defined in claim 9, wherein said ring has a flat surface having an area equal in size to at least one quarter the area of said flat surface of said first electrode.

13. The electrochemical cell as defined in claim 9, wherein said first electrode is molded in place within said can.

14. The electrochemical cell as defined by claim 9, wherein said collector assembly includes an inner cover and a seal provided between said inner cover and said ring and between said inner cover and said inner cylindrical surface of said can, wherein said collector assembly is supported on said ring by placing said seal directly on said ring.

15. The electrochemical cell as defined in claim 9, wherein said electrochemically active material is a hydrogen absorbing material.

16. An electrochemical cell comprising:
   a cylindrical can having an open end and a closed end;
   a first electrode having a generally hollow cylindrical shape molded in place within said can such that an outer cylindrical surface of said first electrode contacts an inner cylindrical surface of said can, said first electrode having a recess adjacent the inner cylindrical surface of said can at an end of said first electrode proximate said open end of said can;
   a second electrode having a polarity opposite said first electrode disposed within a hollow cavity of said first electrode;
   a separator lining the hollow cavity within said first electrode so as to physically separate said first and second electrodes; and
   a collector assembly supported by said first electrode for sealing said open end of said can.

17. The electrochemical cell as defined in claim 16, wherein said collector assembly includes an inner cover and a seal provided between said inner cover and said recessed end of said first electrode and between said inner cover and said inner cylindrical surface of said can, wherein said collector assembly is supported by said first electrode by placing said seal directly on a surface defining a non-recessed portion of said recessed end of said first electrode.

18. The electrochemical cell as defined by claim 16, wherein said first electrode is a positive electrode.

19. The electrochemical cell as defined by claim 16, wherein said first electrode includes $MnO_2$ and said second electrode includes Zn.

20. A method of constructing an electrochemical cell comprising the steps of:
   molding a first electrode inside a cylindrical can such that the first electrode contacts substantially all of an inner cylindrical surface of the can, a cylindrical cavity is defined within the first electrode, and an end of the first electrode closest to an open end of the can has a flat surface portion and a recessed portion adjacent to the inner cylindrical surface of the can;

lining the cylindrical cavity of the first electrode with a separator;

depositing a second electrode/electrolyte mixture within the lined cylindrical cavity;

inserting a preassembled collector assembly into the open end of the can and resting the collector assembly on the flat surface on the end of the first electrode; and crimping an edge of the can along an open end to secure the collector assembly within the can.

* * * * *